United States Patent
Eng

[15] 3,679,304

[45] July 25, 1972

[54] MICROFICHE REPRODUCTION SYSTEM

[72] Inventor: Albert Eng, Chestnut Hill, Mass.

[73] Assignee: Foto-Mem, Inc., Natick, Mass.

[22] Filed: April 15, 1970

[21] Appl. No.: 28,751

[52] U.S. Cl. ..................................................355/41, 355/43

[51] Int. Cl. ....................................G03b 27/62, G03b 27/70

[58] Field of Search ....................................355/5, 14, 41, 43

[56] References Cited

UNITED STATES PATENTS 3,288,025 11/1966 Litz et al..................................355/41

*Primary Examiner*—Samuel S. Matthews
*Assistant Examiner*—Richard A. Wintercorn
*Attorney*—Wolf, Greenfield, Hieken and Sacks

[57] ABSTRACT

An automatic reproduction system which includes a cartridge storage bank for holding cartridges containing microfiche film cards. The cards are notch-coded to facilitate selection of particular cards. A command module controls the selection of a particular cartridge and further controls a cartridge retrieval and refile mechanism which transports the selected cartridge to a microfiche selector. A particular microfiche card is selected and transported to a reproduction station where a duplicate is made. After reproduction, the particular card returns to the cartridge and the cartridge retrieval and refile mechanism transports the cartridge to its position in the cartridge storage bank. The duplicate card is placed in rotary collator for further use. The individual microfiche selection is by forced air so as to protect the film surfaces of the cards within the cartridge from rubbing or scratching against one another.

9 Claims, 6 Drawing Figures

INVENTOR
Albert Eng
BY
Wolf, Greenfield, Hieken & Sacks

INVENTOR
Albert Eng
BY
Wolf Greenfield Hieken & Sacks

INVENTOR
Albert Eng
BY
Wolf, Greenfield, Hieken & Sack

MICROFICHE REPRODUCTION SYSTEM

BACKGROUND OF THE INVENTION

The present invention relates in general to reproduction systems and more particularly concerns a novel automatic reproduction system for film cards of high performance, relatively small physical form which is easy and inexpensive to fabricate in large and small quantities while maintaining a high degree of repeatability in reproduction performance.

The reproduction system provides for automatic storage and retrieval of information carrying film cards, as for example microfiche cards. The system may be completely automated for offline operation, using requests stored on magnetic tape generated by an existing computer system.

It is an important onject of the present invention to provide an automatic reproduction system in which all operations may be controlled by a command module, as for example a small, general purpose computer.

A further object of this invention is to provide a reproduction system which is capable of automatic random retrieval, automatic refiling, and automatic duplication from film masters.

It is another important object of this invention to provide a means and method of coding particular film cards to facilitate the selection thereof.

It is another important object of this invention to provide a reproduction system in which particular film cards are selected in a manner which prevents impairment of the film surface.

It is another important object of the invention to provide a reproduction system in which the duplicates may be collated and sorted for further operations.

It is another object of this invention to provide a reproduction system which will provide for multiple reproduction of individual selected films, as for example microfiche cards, thereby substantially eliminating retrieval and refiling lag time between duplicate card outputs.

It is another object of this invention to provide an automatic reproduction system in which the many coded film cards may be enclosed in a cartridge and selected from a random position in an individual cartridge.

Another object of the invention is to achieve one or more of the preceding objects in a device which can be made at reasonable costs.

SUMMARY OF THE INVENTION

In this invention, a command module, as for example a small general purpose computer, controls the operation of the reproduction system. The reproduction system includes a cartridge storage bank for storing individual cartridges containing multiple film master cards. Preferably, the film masters, as for example microfiche film cards are individually coded within the cartridge so that a particular microfiche card may be retrieved randomly from the cartridge. On application of a signal from the command module, a cartridge retrieval and refile mechanism moves a particular cartridge from its position in the storage bank and transports it to a michrofiche selector. Particular microfiche within the cartridge are identified and selected by a unique combination of notched holes within a specified hole configuration. A particular microfiche is selected by inserting rods through the entire cartridge according to the combination of notched holes and removing the particular microfiche desired by activating an air jet stream beneath the cartridge. In this manner the undersired microfiche cards are held in place by the rods. The removed card is placed in a position for reproduction at a duplicating station. The duplicating station preferably comprises a contact-printing and exposure area, a roll film holder, carrier assembly, a film developing chamber, and a film cutting unit. The film preferably a diazo film, is exposed by optical means and developed preferably in an ammonia chamber, and then cut to size. The duplicate may then be inserted into a specified slot in a collator on signal from the command module.

In a modification of the present invention, there is a second microfiche selector for, likewise, selecting a particular microfiche card from a cartridge. The particular film card is also removed by an air jet stream and placed in a holder for viewing. The holder may be included in an optical system comprised of an optical source, as for example high intensity lamp, a condensing lens, a projection lens, and a viewing screen. The respective operations of cartridge retrieval and refiling, the selection of a particular microfiche card, and the operation of the viewer may be carried out on a signal from the command module.

These and other objects and advantages of the present invention will be more clearly understood when considered in conjunction with the accompanying drawings in which:

DETAILED DESCRIPTION OF THE PREFERRED EMBODIMENTS

Corresponding reference symbols will be used throughout the drawings to indicate corresponding elements where applicable.

Figures 1, 2, 4:
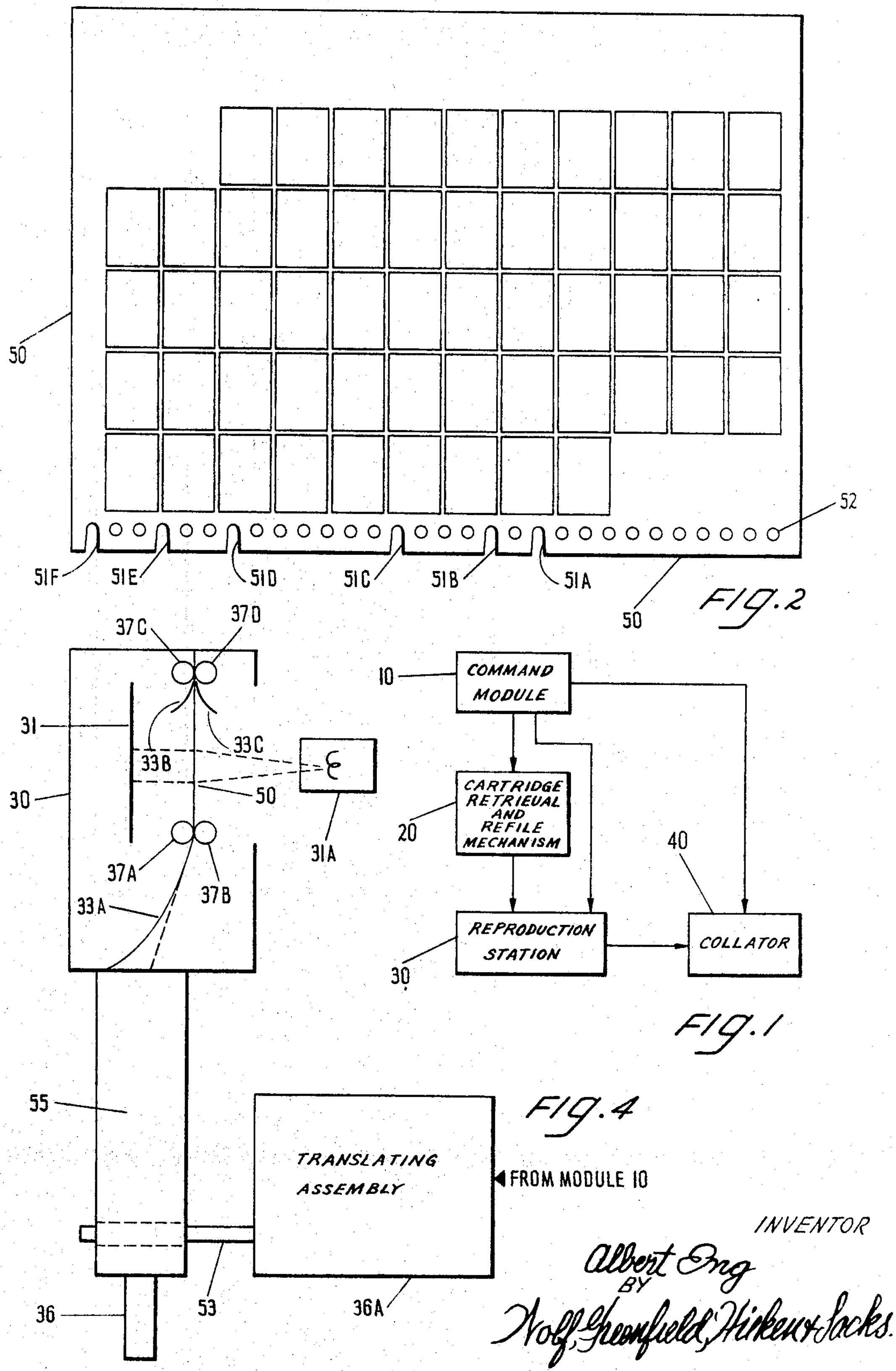
FIG. 1 is a block diagram of an automatic reproduction system according to the invention.
FIG. 2 is a front view of a notch coded microfiche card according to the invention.
FIG. 4 shows the card selection portion of the apparatus looking from the right side of FIG. 3.

With reference now to the drawings and more particularly to FIG. 1 thereof, there is shown a block diagram of an embodiment of the invention in which command module 10 couples to and controls cartridge retrieval and refile mechanism 20. On signal from command module 10, cartridge retrieval and refile mechanism 20 transports a particular cartridge to reproduction station 30 where a particular microfiche card is selected and duplicated. After duplication, the card is returned to the cartridge and the cartridge is refiled in its dedicated position in the cartridge storage bank. The duplicate film card, after developing and cutting, is placed in collator 40 (FIG. 3) to allow further use on signal from command module 10.

With reference now to FIG. 2, there is shown a front view of a notch-coded film card 50. A cartridge (not shown in FIG. 2) may contain a multiplicity of such cards each differently coded. Card 50 includes a series of holes 52, all of which are identical in size and extend from one side of the card 50 to the other on the base thereof. A particular card may be identified by a unique combination of notched holes 51A and 51B, 51C, 51D, 51E, and 51F extending from the specified holes to base 50A to card 50. Each card may comprise a film transparency having a plurality of photo transparancies.

Referring now to 3, there is shown an isometric view of a portion of the invention in which cartridge 55 holding a multiplicity of individual cards, such as film card 50, is selected by cartridge retrieval and refile mechanism 20. Cartridge 55 is likewise equipped with holes 52, all of which are alike and extend along the back and front fact thereof. Holes 52 of cartridge 55 are in the same configuration as those on film card 50, for example. The film cards within cartridge 55 are positioned so that all the holes 52 line up with one another. Cartridge retrieval and refile mechanism 20 includes in the form of a carriage support means 22 adapted for longitudinal movement along cylindrical guide rods 21A and 21B. Support means 22 is equipped with bushings 22A and 22B for establishing a substantially frictionless contact between cylinders 21A and 21B and support means 22. Cartridge retrieval and refile mechanism 20 further includes adjustable vice-like clamping holders 23A and 23B between which cartridge 55 is held.

Figure 3:
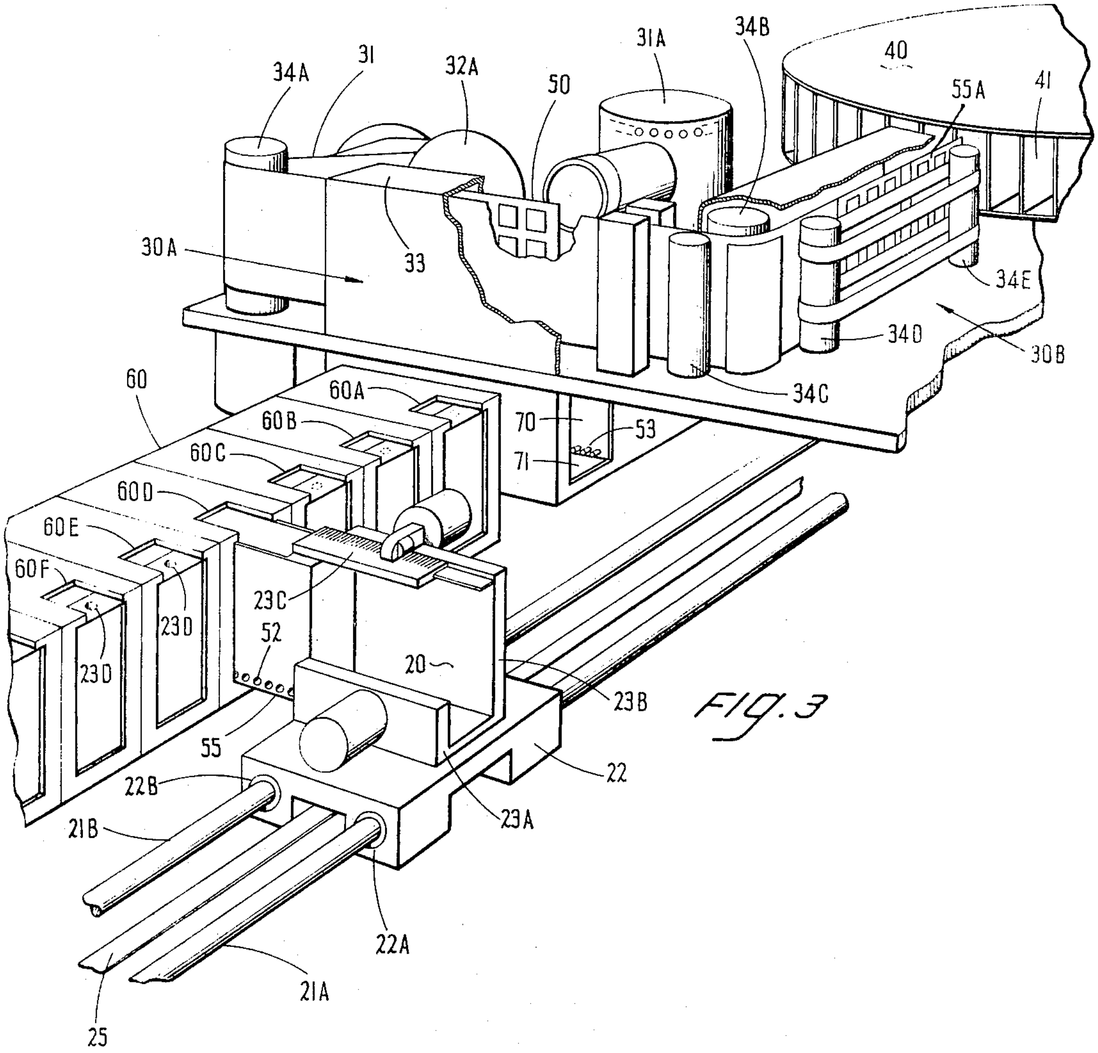
FIG. 3 is an isometric view of a portion of the reproduction system further illustrating logical arrangement of the apparatus.

Cartridge retrieval and refile mechanism 20 includes cartridge retrieval arm 23C which is reciprocally driven by a linear motor (not shown) by suitable means as for example by a rack and pinion or gearing means. The arm 23C has a cylindrical pin (not shown) protruding from its bottom surface at the end close to cartridge 55. A mating hole 23D is formed in each cartridge 55. When the cartridge 22 is appropriately positioned and ready to extract a cartridge 55, a command from command module 10 causes arm 23C to move toward the cartridge 55. The arm 23C mates with hole 23D of the cartridge 55 and pulls the cartridge into place in carriage 22. In FIG. 3 the cartridge is in the process of being extracted from its allocated slot.

Cartridge storage bank 60 is provided with individual slots 60, 60A, 60B, 60C, 60D, 60E, 60F, etc., for holding individual cartridges. After cartridge 55 is selected by cartridge retrieval and refile mechanism 20, the mechanism 20 is driven along cylindrical rods 21A and 21B by a suitable pulling means 25, which may comprise for example a nylon band or string, hereafter more fully described in connection with FIG. 4. The cartridge extraction and moving operation of cartridge retrieval and refile mechanism 20 may be controlled by command module 10. Cartridge 55 is carried by cartridge retrieval and refile mechanism 20 to microfiche selector 70.

Microfiche selector 70 which is shown in more detail in FIG. 4 includes cylindrical rods 53 (only one of which is shown in FIG. 4). All of these rods are alike and adapted to fit into holes 52 of cartridge 55. Rods 53 as shown in FIG. 4 are supported by translating assembly 36A which is in turn, activated upon command from module 10 to insert the rods into the cartridge. The rods 53 are situated in microfiche selector 70 in the same configuration as the holes of cartridge 55 of film 50.

Cartridge retrieval and refile mechanism 20 inserts cartridge 55 into microfiche selector 70; on signal from command module 10, the preselected combination of cylindrical rods 53 are inserted in cartridge 55 through holes 52 thereof. Card 50 may be selected by inserting a combination of cylindrical rods 53 in the unique configuration of notched holes 51A, 51B, 51C, 51D, and 51E, 51F in card 50. An air jet stream supplied at base 71 of microfiche selector 70 forces film card 50 (not retained by cylindrical rods 53) from cartridge 55 through the top thereof to reproduction station 30.

FIG. 4 indicates the manner in which the card 50 is transported to station 30. Air pump 36 blows the selected card upwards from cartridge 55. The card is guided by curved member 33A towards rollers 37A, 37B which grip the card. As the card is moved upward by these rotating rollers a set of guide members 33B, 33C direct the card to rollers 37C, 37D. Finally the card hits the underside of the top of station 30 and is in position. The card can then be duplicated on film 31 by means of assembly 31A.

Referring to FIG. 3 again, reproduction station 30 includes duplicating station 30A and developing and cutting station 30B. Duplicating station 30A includes film 31, as for example Diazo film, mounted on reel 32A and adapted for motion through exposure area 33 on signal from command module 10. Flash lamp and optics assembly 31A exposes film 31 to duplicate film card 55 likewise in response to signal from command module 10. Film 31 is carried by rollers 34A, 34B, 34C, 34D, and 34E to developing and cutting station 30B where film 31 is developed, preferably in an ammonia vapor chamber, and cut by cutting means 35 to size on signal from command module 10. Rollers 34D and 34E carry developed film, as for example film 55A to radial slot 41 in rotary collator 40. The respective slot for a particular film duplicated may be chosen by rotary motion of collator 40 on signal from command module 10.

Figure 5:
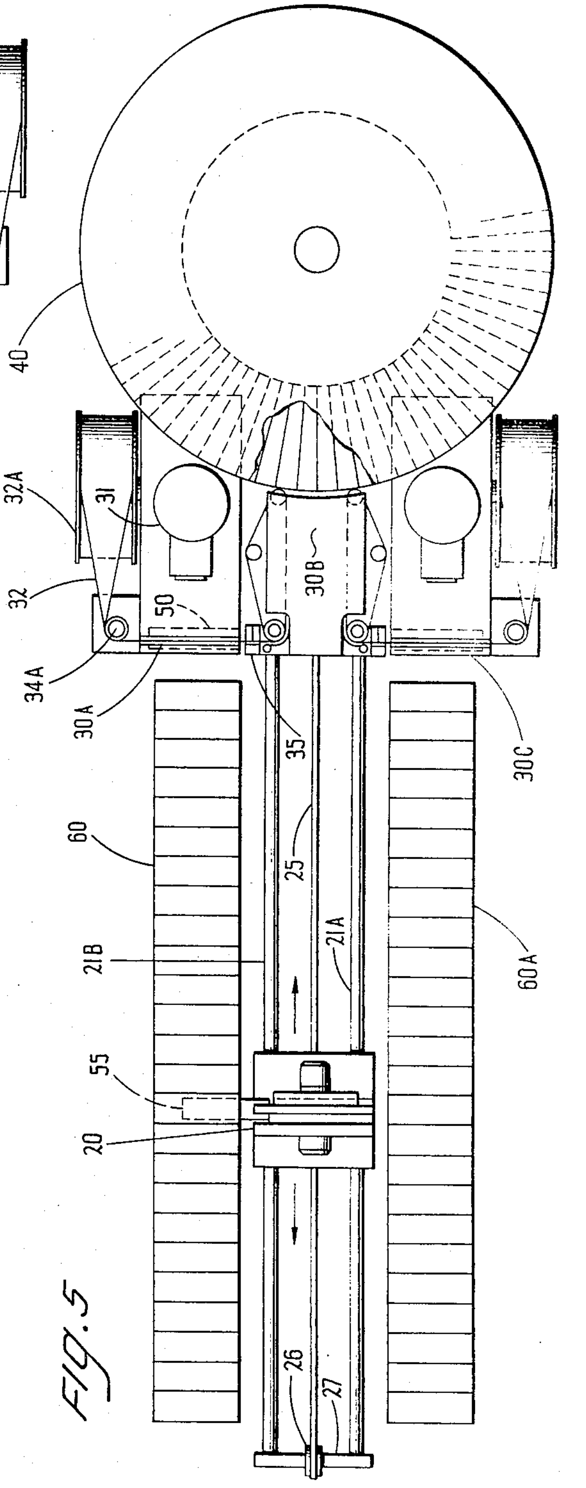
FIG. 5 is a top view of a reproduction system in which two duplicating stations are shown.

Referring now to FIG. 5, there is shown a top view of a portion of an embodiment of the invention in which two reproduction stations and tow rows of cartridge storage banks are illustrated. Cartridge storage bank 60 and 60A contain slots (as shown in FIG. 3) for holding cartridges similar to cartridge 55. Again, an individual cartridge is selected by cartridge retrieval mechanism 20, which is supported by cylindrical rods 21A and 21B interposed between cartridge storage banks 60 and 60A. The longitudinal movement of cartridge retrieval and refile mechanism 20 is controlled by pulling means 25, which may comprise a complete two-pulley loop driven at one pulley by a motor (not shown) which is regulated by signals from command module 10 and having pulley 26 at the other end of the loop. The bank or strip 25 at its ends to carriage 20, with the loop extending around the pulleys at either end of the parallel banks. Pulley 26 and cylindrical rods 21A and 21B are supported by axial support means 27. Preferably, cartridge retrieval and refile mechanism 20 is adapted for extracting and refiling packages from slots in either cartridge storage bank 60 or cartridge storage bank 60A on command from command module 10. FIG. 3 shows one way of extracting these cartridges. Again, the selected cartridge 55 is transported to the microfiche selector 70 (not shown in this figure), but similar to that illustrated in FIG. 3 and 4, where an individual microfiche card 50 is selected and transported upwardly to duplicate station 30A. Likewise, a cartridge retrieval and refile mechanism 20 may transport a cartridge to a corresponding microfiche selector on the side of cartridge storage 60A for transporting a particular microfiche card to duplicate station 30C. Developing station 30B as illustrated, is similar in arrangement to that previously described and may comprise a common chamber for developing duplicates of particular microfiche cards selected from either storage bank 60 or storage bank 60A. Again, the functions of the duplicating stations 30A and 30C and developing station 30B and the microfiche selectors may be controlled by signals from command module 10.

Figure 6:
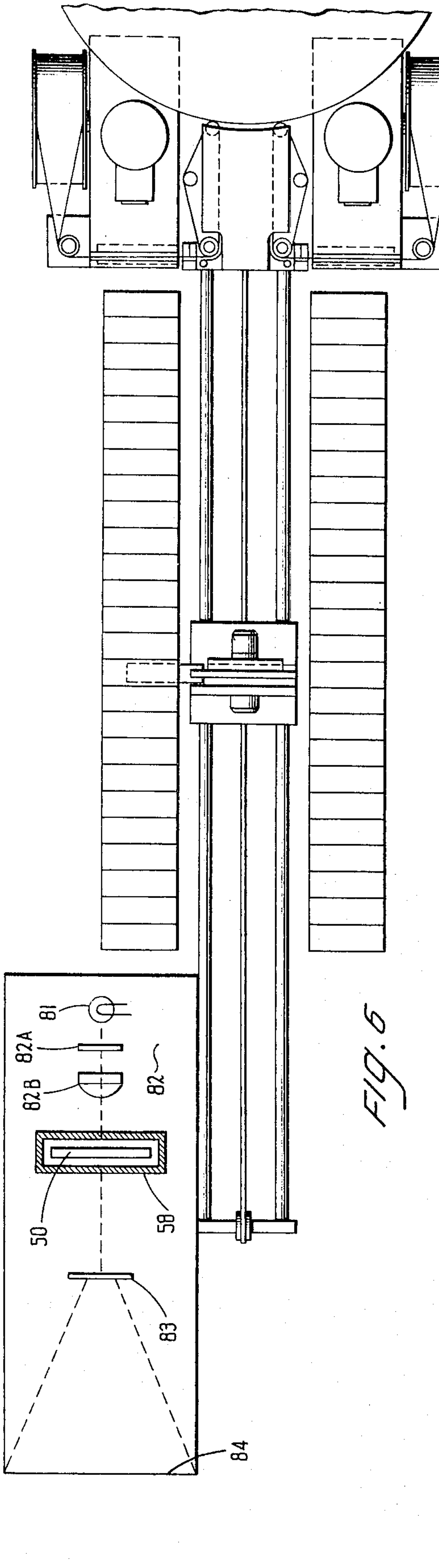
FIG. 6 is a top view of a portion of a modification of the of the invention of which a viewing system is shown.

Referring now to FIG. 6, there is shown a top view of a portion of a modification of the invention in which the viewing portion of the reproduction system is shown. In this embodiment the viewing means is located at the end of the cartridge storage bank remote from the reproduction means. Again, individual cartridges, as for example cartridge 55, are located in slots in cartridge storage bank 60 and selected and transported by the cartridge retrieval and refile mechanism 20 on signal from command module 10. Microfiche selector 70 again serves to select a particularly coded microfiche card, as for example film card 50. As above, an air jet stream transfers card 50 from cartridge 55. Film card 50 is shown positioned adjoining transparent plate 58 for viewing in viewing system 80. The positioning card 50 may be accomplished as in FIG. 4 with a series of rollers and guidance members. To more clearly show the viewing system the positioning means has not been shown in FIG. 6. Viewing system 80 is generally conventional in design and includes light source 81, preferably a high intensity lamp, condensing lens system 82, projection lens 83, and viewing screen 84. Condensing lens system 82 includes heat absorbing glass 82A, adapted to prevent damage to film 50, and condensing lens 83B. Transparent holder 58 may include adjustable means for adjusting film card 50 relative to the lens system to allow viewing of individual frames. An X–Y coordinate translating system could be used. Also, projection lens 83 may include adjustable means for focusing the image of card 50 on viewing screen 84. Preferably, viewing screen 84 may include an anti-reflection coating surface to prevent glare and surface reflections from disturbing the viewed image.

An important feature of the invention is the adaptability of the reproduction of the system for use with a multiplicity of cartridge storage banks and reproduction units. When multiple reproduction units are used: the entire system is allowed to operate at a higher reproduction rate, the system operates with less down-time loading film and the cartridge retrieval-refilling times are overlapped resulting in a higher output of duplicates per operation.

Another feature of the invention is the adaptability of the reproduction systems to use of a variety of films types. Virtually any type of film and exposure method may be used. The invention is illustrated as using a roll of Diazo film with an ammonia vapor developing chamber. Preferably, the ammonia vapor chamber has an exhaust system to avoid the unpleasantness of the ammonia vapors. The vapors supply may be continuously replenished by anyhydrous ammonia. The choice of Diazo film over other existing dry process films was due to cost, reliability in exposures, uniformity and proven, problem free developing process. Also, the film may be handled in standard room ambient light conditions, thus, there is no need of a dark room process and possible spoilage of the film due to room light exposures.

Another feature of the invention is the adaptability of the reproduction system for use with a variety of collating devices. The invention is illustrated with a rotary collating unit which may be controlled by the command module. In one embodiment, the collator may have sixty slots, each slot having the capacity for 50 microfiche for a total of 3,000 microfiche for the collator.

Another feature of the invention is the novel selection procedure used for extracting particular microfiche cards. The coding procedure allowed selection of a particular card from among many, as for example thousands, and allows a particular card to be transferred from the cartridge by means of a jet stream to prevent damage to other cards by rubbing. Moreover, the particular notched coding for each card may correspond to a pre-determined number assigned to that card, as for example the date and number for a technical report. Moreover, the holes at the bottom of the card may be divided into selected groups so as to indicate binary numbers. The particular notching may indicate a specific coding for the card established in the binary number system.

Another feature of the invention is the adaptability of the device to easy maintenance procedures. All of the operating components are essentially modular in design and may each be removed without disturbing the other portions of the system.

Another important feature of the invention is the fast access time to individual cartridge slots in the cartridge storage bank achieved by use of the cartridge retrieval and refile mechanism. The movement of the cartridge retrieval and refile mechanisms is on one axis only. Thus, fast access to individual cartridge compartments for retrieval and refiling of cartridges is obtained. Another feature of the invention is the adaptability of the device to a variety of cartridges and films. The cartridge may be of a plastic or any suitable material and may hold virtually any number of film cards.

Other modifications and users of and departures from the specific embodiments described herein may be practiced by those skilled in the art without departing from the inventive concepts. Consequently, the invention is to be constructed as embracing each and every novel feature and novel combinations of features present in and possessed by the apparatus and is to be construed as limited soley by the spirit and scope of the appended claims.

What is claimed is:

1. Apparatus for reproducing comprising film means,
cartridge means for holding said film means,
storage means for holding said cartridge means,
control means,
transporting means, reproduction means, and selecting means responsive to said control means,
said transporting means adapted for retrieving and returning a predetermined cartridge means from and to said storage means and for carrying said predetermined cartridge means to and from said selecting means, said selecting means adopted for choosing a particular film means from said predetermined cartridge means and for carrying said particular film means to said reproduction means, and said reproduction means adapted for receiving and reproducing said particular film means,
wherein said film means includes coding means for designating a particular film means,
said coding means forming a portion of said film means and having a serial arrangement of holes positioned relatively near an edge of said film means and notch means for extending a predetermined combination of said holes to said edge.

2. Apparatus for reproducing as defined in claim 1 wherein said cartridge means has a series of holes disposed therein adapted to mate with holes in said film means.

3. Apparatus for reproducing as defined in claim 1 wherein said serial arrangement of holes is positioned along a bottom edge of said film means.

4. Apparatus for reproducing comprising film means,
cartridge means for holding said film means,
storage means for holding said cartridge means,
control means,
transporting means, reproduction means, and selecting means responsive to said control means,
said transporting means adapted for retrieving and returning a predetermined cartridge means from and to said storage means and for carrying said predetermined cartridge means to and from said selecting means, said selecting means adopted for choosing a particular film means from said predetermined cartridge means and for carrying said particular film means to said reproduction means, and said reproduction means adapted for receiving and reproducing said particular film means,
wherein said film means has holes disposed along one edge thereof precoded ones of which are notched and wherein said selecting means includes a plurality of rods adapted upon command from said control means, to insert into the holes in said film means.

5. Apparatus for reproducing as defined in claim 4, including blower means cooperatively coupled to said selecting means for causing an upward blowing force to said film means, thereby causing a pre-coded one of said film means to exit from said selecting means to said reproducing means.

6. Apparatus for reproducing as defined in claim 5 wherein said selecting means also includes guiding means for directing said pre-coded, selected film means from said selecting means to said reproducing means.

7. Apparatus for reproducing as defined in claim 6 wherein said guiding means includes a curved card guidance member and a series of transport rollers.

8. Apparatus for reproducing comprising film means,
storage means for holding said cartridge means,
control means,
transporting means, reproduction means, and selecting means responsive to said control means,
said transporting means adapted for retrieving and returning a predetermined cartridge means from and to said storage means and for carrying said predetermined cartridge means to and from said selecting means, said selecting means adopted for choosing a particular film means from said predetermined cartridge means and for carrying said particular film means to said reproduction means, and said reproduction means adapted for receiving and reproducing said particular film means,
wherein said reproducing means includes an image-receptive medium and a duplicating station wherein a latent image of said film means is formed on said medium,
wherein said reproducing means further includes cutting and developing means for said medium.

9. Apparatus for reproducing as defined in claim 8 further including a rotary collator coupled to said developing means for storing said medium after it has been cut.

* * * * *